(12) United States Patent
Kersch et al.

(10) Patent No.: US 11,196,652 B2
(45) Date of Patent: Dec. 7, 2021

(54) TRANSPORT LAYER MONITORING AND PERFORMANCE ASSESSMENT FOR OTT SERVICES

(71) Applicant: Telefonaktiebolaget LM Ericsson (publ), Stockholm (SE)

(72) Inventors: Péter Kersch, Budapest (HU); Andras Valkó, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 23 days.

(21) Appl. No.: 16/483,448

(22) PCT Filed: Feb. 7, 2017

(86) PCT No.: PCT/EP2017/052642
§ 371 (c)(1),
(2) Date: Aug. 5, 2019

(87) PCT Pub. No.: WO2018/145729
PCT Pub. Date: Aug. 16, 2018

(65) Prior Publication Data
US 2020/0021507 A1 Jan. 16, 2020

(51) Int. Cl.
*H04L 12/26* (2006.01)
*H04L 12/24* (2006.01)

(52) U.S. Cl.
CPC ...... *H04L 43/0864* (2013.01); *H04L 41/5009* (2013.01); *H04L 43/04* (2013.01); *H04L 43/0888* (2013.01)

(58) Field of Classification Search
CPC . H04L 43/0864; H04L 43/04; H04L 41/5009; H04L 43/0888; H04L 12/26; H04L 12/24; H04L 45/22; H04L 45/28; H04L 45/302; H04L 45/64; H04L 12/4641; H04L 63/0218; H04L 47/726; H04L 63/02; H04L 47/801; H04L 63/0254; H04L 47/825; H04L 47/805; H04L 63/0236;
(Continued)

(56) References Cited

U.S. PATENT DOCUMENTS 6,701,363 B1 3/2004 Chiu et al.
9,088,611 B2 * 7/2015 Jagadeeswaran ..... H04L 69/163
(Continued)

FOREIGN PATENT DOCUMENTS

| WO | 2013044997 A1 | 4/2013 |
| WO | 2015144211 A1 | 10/2015 |
| WO | 2017137091 A1 | 8/2017 |

*Primary Examiner* — Jung Liu
(74) *Attorney, Agent, or Firm* — Coats & Bennett, PLLC

(57) ABSTRACT

The present disclosure is directed to aspects of assessing performance of a session between an OTT service provider endpoint and an OTT service recipient endpoint in regard of a particular OTT service. The performance assessment is based on a series of data records generated for the session. Data record generation includes monitoring, at a network site between the two endpoints and during successive periods of time, at least one transport layer connection of the session. The monitoring is performed to determine, for each period of time, an activity metric indicative of a pending transport layer activity of the session in the respective period of time. This activity metric is then evaluated in connection with service performance assessment.

18 Claims, 8 Drawing Sheets

(58) Field of Classification Search
CPC ............. H04L 63/0263; H04L 12/4633; H04L 12/465; H04L 63/0272
See application file for complete search history.

(56) References Cited

U.S. PATENT DOCUMENTS

| | | | | |
|---|---|---|---|---|
| 9,756,061 | B1* | 9/2017 | Roeh | H04L 63/1425 |
| 2010/0121972 | A1* | 5/2010 | Samuels | H04L 47/10 |
| | | | | 709/231 |
| 2010/0269044 | A1* | 10/2010 | Ivanyi | H04L 41/5067 |
| | | | | 715/736 |
| 2013/0301415 | A1* | 11/2013 | Archer | H04L 65/4084 |
| | | | | 370/235 |
| 2014/0215077 | A1* | 7/2014 | Soudan | H04L 47/822 |
| | | | | 709/226 |
| 2014/0269269 | A1* | 9/2014 | Kovvali | H04W 24/04 |
| | | | | 370/229 |
| 2015/0029925 | A1* | 1/2015 | Mantin | H04W 72/005 |
| | | | | 370/312 |
| 2015/0341812 | A1* | 11/2015 | Dion | H04N 21/2404 |
| | | | | 370/252 |
| 2016/0337241 | A1* | 11/2016 | Herrero | H04L 47/12 |
| 2017/0359735 | A1* | 12/2017 | Jain | H04W 24/10 |
| 2018/0013583 | A1* | 1/2018 | Rubenstein | H04L 45/64 |
| 2018/0048567 | A1* | 2/2018 | Ignatchenko | H04L 43/087 |
| 2018/0091417 | A1* | 3/2018 | Ore | H04L 45/28 |
| 2018/0270209 | A1* | 9/2018 | Arunachalam | H04L 63/0485 |
| 2018/0288017 | A1* | 10/2018 | Stephan | H04L 63/0471 |
| 2020/0107226 | A1* | 4/2020 | Raleigh | H04W 28/10 |

\* cited by examiner

TRANSPORT LAYER MONITORING AND PERFORMANCE ASSESSMENT FOR OTT SERVICES

TECHNICAL FIELD

The present disclosure generally relates to Over The Top (OTT) services. In more detail, techniques for transport layer monitoring of OTT services and for performance assessment of the monitored OTT services are presented. The techniques may be implemented in the form of network entities, apparatuses, systems, methods and computer program products.

BACKGROUND

Multimedia streaming services offered by OTT service providers such as YouTube, Netflix and Spotify have become increasingly popular in recent years. This increase in popularity is mainly due to bandwidth increases of the communications networks underlying these OTT services and the widespread adoption of new computing devices, such as smartphones and tablet computers.

OTT services are generally provided to OTT service recipients without any content-related involvement of providers of the underlying communication network services (such as an Internet service provider or an operator of wireless network access).

Network service providers are nonetheless interested in assessing the performance of OTT services provided via their communication networks. This interest is rooted in the fact that OTT service performance assessment is an important function of Customer Experience Management (CEM) applications within the domain of network service providers. Moreover, unsatisfactory OTT service performance can be indicative of technical problems of the underlying communication networks.

Network service providers currently use two approaches for assessing OTT service performance. One such approach is Deep Packet Inspection (DPI) of OTT service traffic across their communication network infrastructure Shallow Packet Inspection (SPI) is another performance monitoring approach for OTT services.

DPI is performed in regard of different protocols and different protocol layers. One object of DPI is to reconstruct dedicated states at the OTT service recipient for each individual session. As one example, a reconstructed media buffering state can be analyzed to determine the occurrence of network throughput bottlenecks (that, e.g., can be derived from a repeated depletion of the media buffer) and similar network problems.

DPI has several drawbacks. For example, OTT service providers frequently change protocols and service delivery mechanisms, so that any DPI approach has to dynamically accommodate to such changes. Additionally, the increasing OTT service volume, in particular in regard of video traffic, imposes significant hardware requirements on any DPI implementation. Further, OTT service providers increasingly employ Transport Layer (TL) encryption, making DPI technically unfeasible. Strict privacy legislations in some countries do not allow inspection of OTT service traffic above the network layer (e.g., the Internet Protocol, IP, layer), making DPI illegal.

A further drawback of DPI is the fact any that any service performance metric derived therefrom is inherently inaccurate. This inaccuracy results from the fact that it is often not possible to reconstruct all states and settings of the OTT service recipient from monitored OTT service traffic (e.g., it is difficult to assess how much video content an OTT video service recipient is buffering before starting video play out).

SPI only parses lower protocol layers up to the transport layer and primarily evaluates TL performance. The evaluation results may then be correlated with OTT service performance using suitable modelling techniques.

It has, however, been found that conventional SPI approaches are no suitable vehicles for network service providers to reliably evaluate OTT service performance. While there does exist a correlation between SPI metrics (e.g., TL throughput) and OTT service performance, such a correlation cannot easily be determined. For example, a temporarily bad TL connection is not necessarily indicative of an OTT service performance degradation. When, for example, an OTT service recipient endpoint such as a smartphone has a high media buffer fill level, a temporarily low TL throughput can easily be compensated for in media play out without any play out degradation.

Moreover, a low TL throughput can have various reasons that do not necessarily imply a bad OTT service performance. For example, a low TL throughput may simply be the result of the fact that there are no data that need to be transmitted between the endpoints of the OTT service. When, for example, a media transmission protocol defines burst-type media transmissions, the TL throughput will necessarily be low or even zero between two consecutive media bursts. As such, a low TL throughput alone does not necessarily imply a degradation of OTT service performance.

SUMMARY

Accordingly, there is a need for a technique that permits an efficient TL monitoring for OTT services. There is also a need for an efficient performance assessment of OTT services based on the TL monitoring results.

According to a first aspect, a network entity for generating data records indicative of pending TL activities of a session between an OTT service provider endpoint and an OTT service recipient endpoint is provided. The network entity is configured to monitor, at a network site between the two endpoints and during successive periods of time, at least one TL connection of the session, wherein the monitoring includes, for each period of time, determining for the at least one TL connection of the session at least one activity metric indicative of at least one pending TL activity of the session in the respective period of time. The network entity is further configured to generate, for a period of time with at least one pending TL activity, a data record that includes the activity metric associated with that period of time.

The network site at which the monitoring is performed can be any site in a wireless or wired communication network. In more detail, the network site can be any site that permits to probe network traffic transported via the communication network between the OTT service provider endpoint and the OTT service recipient endpoint.

Each activity metric may take the form of a measurement of a particular characteristic of the TL connection. Different activity metrics may be associated with different pending TL activities.

A TL messaging procedure may be considered to constitute a TL activity. The TL messaging procedure may comprise one, two or more TL messages. A pending TL activity may be a TL messaging procedure that has been started (e.g., transmission of an initial message from one endpoint to the other may start pendency) but is still awaiting completion (e.g., transmission of a completion message from the other endpoint may stop pendency). A pending TL activity may thus be a TL messaging procedure in which one endpoint is presently waiting for at least one TL message from the other endpoint.

The at least one awaited TL message may include an acknowledgement message from a receiving endpoint for a previously transmitted data unit (e.g., in the context of an Automatic Repeat Request-, ARQ-, type communication scenario between the two endpoints). Additionally, or in the alternative, the at least one TL message may include an acknowledgment message in a TL connection setup procedure. The TL connection setup procedure may relate to a setup of an initial TL connection for the session (i.e., mark the start of the session) or may relate to setup of a later TL connection during the session. Moreover, the at least one TL message may alternatively or additionally include a resumption message from a receiving endpoint having paused a data transfer for being busy processing one or more previously received data units.

In one implementation, the activity metric included in the data record is indicative of at least one pendency period associated with the at least one pending TL activity of the session. The at least one pendency period results from the one endpoint being waiting for at least one TL message from the other endpoint to complete a TL messaging procedure.

The session may comprise multiple pending TL activities in the respective period of time. In such a case, the activity metric may be indicative of the aggregated pendency periods of the multiple pending TL activities. In addition, or in an alternative variant, an individual activity metric for each individual one of the multiple pending TL activities in the respective period of time may be included in the data record (e.g., in the form of individual sub-records).

The session may comprise multiple co-existing TL connections in at least a portion of a given period of time. In such a case the network entity may further be configured to aggregate pending TL activities in the given period of time across the multiple TL connections. Moreover, the activity metric for the given period of time may in such a case be indicative of the aggregated pending TL activities. As such, the activity metric may take the same value regardless of whether multiple pending TL activities have occurred in regard of a single TL connection or in regard of a plurality of TL connections of the session.

The data record may in one variant be indicative of one or more activity metrics. In particular, each activity metric may be associated with a dedicated activity type. The activity type associated with a particular activity metric may also be indicated in the data record (e.g., in the form of a Attribute-Value-Pair, AVP).

Generally, the activity types may include one or more of a data transfer from the service provider endpoint to the service recipient endpoint; a data transfer from the service recipient endpoint to the service provider endpoint; a TL connection setup; a data transfer being paused by the service recipient endpoint for being busy processing one or more previously received data units; and a data transfer being paused by the service provider endpoint for being busy processing one or more previously received data units. Depending on the particular activity type, the associated activity metric may be expressed as a temporal duration, as a data volume, as a counter, and so on.

In one implementation, the activity metric included in the data record is indicative of a maximum acknowledgment delay for a transmitted data unit during the period of time associated with that data record. It is to be noted that the maximum acknowledgment delay may be longer than the period of time associated with the data record. The maximum acknowledgment delay may be determined as the longest of all pendency periods associated with outstanding acknowledgment messages from a receiving endpoint (e.g., associated with the service recipient or the service provider) for previously transmitted data units.

In one variant, the data record includes a separate sub-record for each individual pending TL activity occurring during the period of time associated with that data record. In scenarios in which pending TL activities are grouped into activity types, the data record may alternatively, or in addition, include a separate sub-record for each individual activity type occurring during the period of time associated with that data record.

The data record may be indicative of the OTT service provider associated with the monitored session. Additionally, or in the alternative, the data record may be indicative of the OTT service associated with the monitored session. As an example, the data record may include an identifier of at least one of the OTT service provider and the OTT service. A given user may be accessing multiple different OTT services from multiple different OTT service providers at the same time and with the same user terminal (e.g., listening to music from Spotify while checking a Facebook page). Thus, for each OTT service and OTT service provider combination a separate set of consecutive data records may be generated.

The data record may be indicative of a data volume transmitted during the period of time associated with that data record. The data record may differentiate between a first data volume transmitted from the service provider endpoint to the service recipient endpoint and a second data volume transmitted from the service recipient endpoint to the service provider endpoint.

The network entity may further be configured to suppress the generation of a data record in case there has been no pending TL activity during the associated period of time. As such, the absence of a data record for a particular period of time may be construed to be indicative of an absence of any pending TL activity during that period of time. Alternatively, the activity metric may be configured to indicate that there has been no pending TL activity during the respective period of time for which a particular data record has been generated. In a latter case, the activity metric may, for example, be configured to assume the value zero.

The data transfer between the service provider endpoint and the service recipient endpoint may be encrypted or non-encrypted. In case the data transfer is encrypted, the network entity may determine the activity metric without decrypting the data transfer.

According to another aspect, an apparatus for assessing service performance from a session between an OTT service provider endpoint and an OTT service recipient endpoint in regard of an OTT service is provided. The apparatus is configured to access data records generated for successive periods of time for the session, wherein each data record includes at least one activity metric indicative of at least one pending TL activity of the session in the period of time associated with that data record. The apparatus is further configured to assess performance of the OTT service based on the at least one activity metric.

The apparatus may be configured to assess the OTT service performance by processing the data records to differentiate between idle phases and activity phases during the session. Idle phases may be phases without any pending TL activity. Activity phases may be phases with at least one pending TL activity. After a differentiation between idle phases and activity phases, the OTT service performance may be assessed based on the activity phases and not based on the idle phases.

The apparatus may be configured to assess the OTT service performance by identifying one or more data delivery bursts from the data records. From the identified one or more data delivery bursts, a media bitrate may be estimated (e.g., as a function of time). The OTT service performance may then be assessed based on the estimated media bitrate. The apparatus may generally be configured analyse the activity phases to identify the one or more data delivery bursts. As such, each activity phase may include one, two or more data delivery bursts.

The apparatus may also be configured to classify the identified one or more data delivery bursts at least into an initial buffering burst type and an update burst type. An initial buffering burst typically occurs prior to start of media play out by the service recipient, whereas an update burst typically occurs during media play out. In the case of such a classification, the media bitrate (e.g., a media encoding rate) may be estimated from one or more update bursts and not from any initial buffering burst. An initial buffering burst may thus be disregarded in connection with media bitrate estimation.

The apparatus may be configured to assess the OTT service performance by estimating, from the received data records, a buffer state of the service recipient as a function of time. The buffer state may be estimated based on, for example, the estimated media bitrate and/or at least one other estimated parameter derived from the data records. The OTT service performance may then be assessed based on a temporal variation of the buffer state.

The result of the assessing step may be at least one Key Performance Indicator (KPI) for the OTT service. The KPI may take the form of an estimated media bitrate and/or of an initial media buffering time at the service recipient endpoint (e.g., prior to start of media play out) and/or of a stall time of media play out at the service recipient endpoint (e.g., after start of media play out).

In one example, the one or more KPIs are each indicated with an associated probability value or range. The probability value or range may indicate a confidence level associated with a particular KPI.

Also provided is a system for assessing performance of an OTT service. The system comprises the monitoring network entity as well as the performance assessment apparatus as described herein.

According to a still further aspect, a method of generating a data record indicative of pending TL activities of a session between an OTT service provider endpoint and an OTT service recipient endpoint is provided. The method comprises monitoring, at a network site between the two endpoints and during successive periods of time, at least one TL connection of the session, wherein the monitoring includes, for each period of time, determining for the at least one TL connection of the session at least one activity metric indicative of at least one pending TL activity of the session in the respective period of time. The method further comprises generating, for a period of time with at least one pending TL activity, a data record that includes the activity metric associated with that period of time.

According to a still further aspect, a method of assessing service performance from a session between an OTT service provider endpoint and an OTT service recipient endpoint in regard of an OTT service is provided. The method comprises accessing data records generated for successive periods of time for the session, wherein each data record includes at least one activity metric indicative of at least one pending TL activity of the session in the period of time associated with that data record. The method further comprises assessing performance of the OTT service based on the at least one activity metric.

The data records may be accessed by the performance assessment apparatus in a data storage (e.g., a database). The data records in the data storage may have been generated by the network entity presented herein. As such, the network entity may likewise have access to the data storage to write the data records in the data storage for being accessed and read by the performance assessment apparatus. The network entity and the performance assessment apparatus may be co-located at the network site. One or both of the network entity and the performance assessment apparatus may be provided in a distributed manner (e.g., in a computing cloud).

Also provided is a computer program comprising program code portions to perform the steps of any of the methods presented herein when the computer program product is run on a processor. The computer program may be stored on a computer-readable recording medium such as a semiconductor memory, CD-ROM, DVD-ROM, and so on.

BRIEF DESCRIPTION OF THE DRAWINGS

Further details of the present disclosure will become apparent from the following description of embodiments and the drawings, wherein.

DETAILED DESCRIPTION

In the following description, for purposes of explanation and not limitation, specific details are set forth, such as specific OTT services and specific protocol procedures, in order to provide a thorough understanding of the techniques discussed herein. It will be apparent to one skilled in the art that these techniques may be practiced in other embodiments that depart from the specific details described herein. Moreover, while the following examples will be described with reference to exemplary media streaming protocols, in particular media streaming protocols with a burst-type data transmission behavior, such as Dynamic Adaptive Streaming for the Hypertext Transfer Protocol (DASH) and Hypertext Transfer Protocol Live Streaming (HLS), it will be appreciated that the present disclosure can also be implemented in connection with any other adaptive or non-adaptive streaming protocol (e.g., that is not based on HTTP or that has a continuous data transmission behavior).

Those skilled in the art will further appreciate that the services, functions, steps and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced Reduced Instruction Set Computer (RISC) Machine (ARM).

It will also be appreciated that, while the following embodiments are primarily described in the context of methods and devices, the present disclosure may also be embodied in a computer program product as well as in a system comprising one or more processors and one or more memories coupled to the one or more processors, wherein the one or more memories are encoded with one or more programs that perform the services, functions, steps and implement the modules disclosed herein when executed on the one or more processors.

Figure 1:
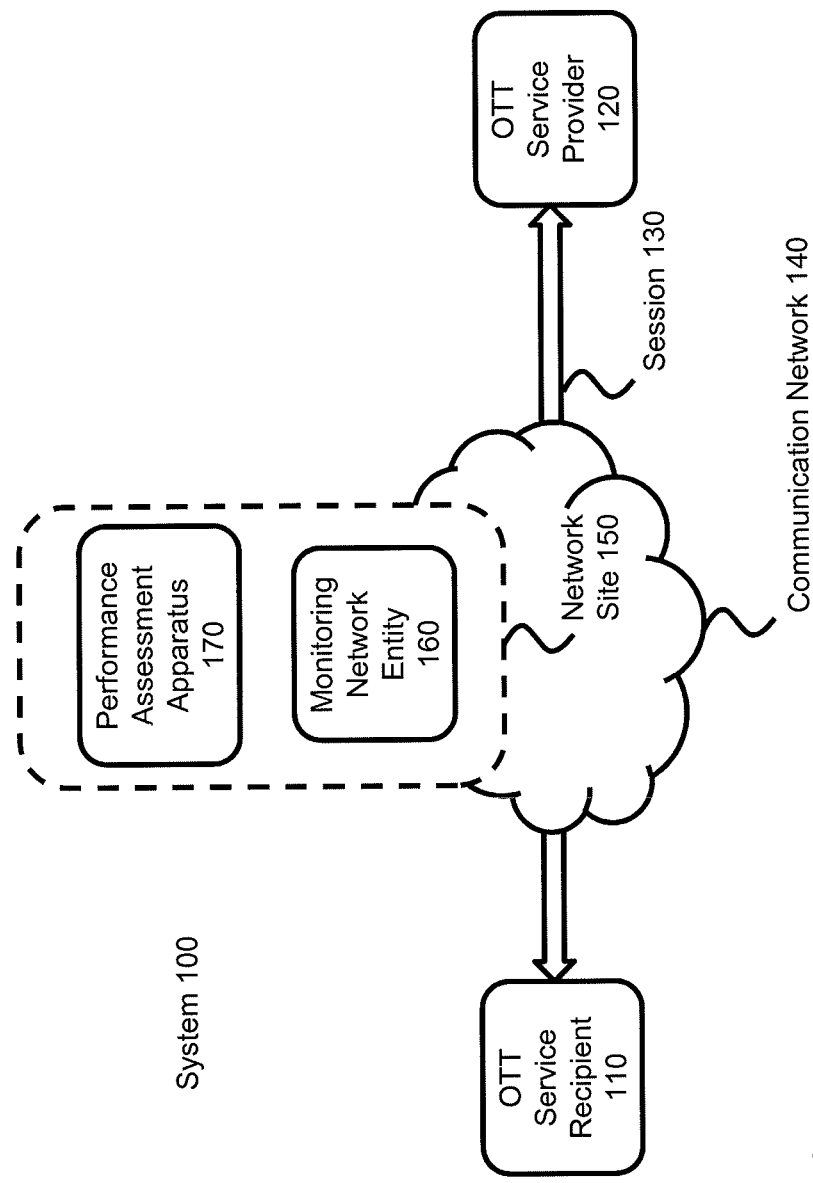
FIG. 1 shows is a block diagram schematically illustrating an embodiment of a system for monitoring and assessing an OTT service.

FIG. 1 shows an embodiment of a system 100 in which the techniques proposed herein may be implemented.

As illustrated in FIG. 1, the system 100 comprises an OTT service recipient 110 as well as an OTT service provider 120. The OTT service provider 120 provides an OTT service to the OTT service recipient 110 via a communication network 140. The OTT service is provided in form of a session 130 between a first endpoint on the side of the OTT service provider 120 and a second endpoint on the side of the OTT service recipient 110.

The endpoint on the side of the OTT service provider 120 may take the form of a network server (e.g., an Internet server) capable of streaming video, audio or multimedia content using a streaming protocol such as DASH or HLS. The endpoint on the side of the OTT service provider 120 may also take the form of an application running on such a network server. The network server may be located in a computing cloud within the premises of the OTT service provider 120.

The endpoint on the side of the OTT service recipient 110 may take the form of a user terminal, such as a smartphone, a tablet computer, a stationary computer, a television set, and so on. The endpoint on the side of the OTT service recipient 110 may also take the form of an application (e.g., a multimedia client application) or a browser running on any such user terminal.

The communication network 140 may be realized using wireless or wired network technologies, or a combination thereof. For example, the communication network 140 may include a cable network, a wireless access network (i.e., according to a third, fourth or fifth generation cellular communication standard), or a combination thereof.

As shown in FIG. 1, a monitoring network entity 160 and a performance assessment apparatus 170 are located at a network site 150 between the two session endpoints associated with the OTT service recipient 110 and the OTT service provider 120, respectively. The monitoring network entity 160 and the performance assessment apparatus 170 belong to a Customer Experience Management (CEM) functionality of a network service provider operating a least a portion of the communication network 140. Of course, the monitoring network entity 160 and the performance assessment apparatus 170 could also belong to any other network functionality.

One or both of the network entity 160 and the performance assessment apparatus 170 may each be realized as a hardware component, as a software component, or as a combination thereof. For example, one or both of the network entity 160 and the performance assessment apparatus 170 may each be realized as a single or distributed network node or software running on such a network node.

While in FIG. 1 the monitoring network entity 160 and the performance assessment apparatus 170 are depicted to be co-located at the network site 150 (e.g., in a dedicated network node), it has to be noted that the monitoring network entity 160 and the performance assessment apparatus 170 could also be located at different sites. Moreover, one or both of the monitoring network entity 160 and the performance assessment apparatus 170 could also be provided in a virtualized manner using cloud computing resources.

Figure 2:
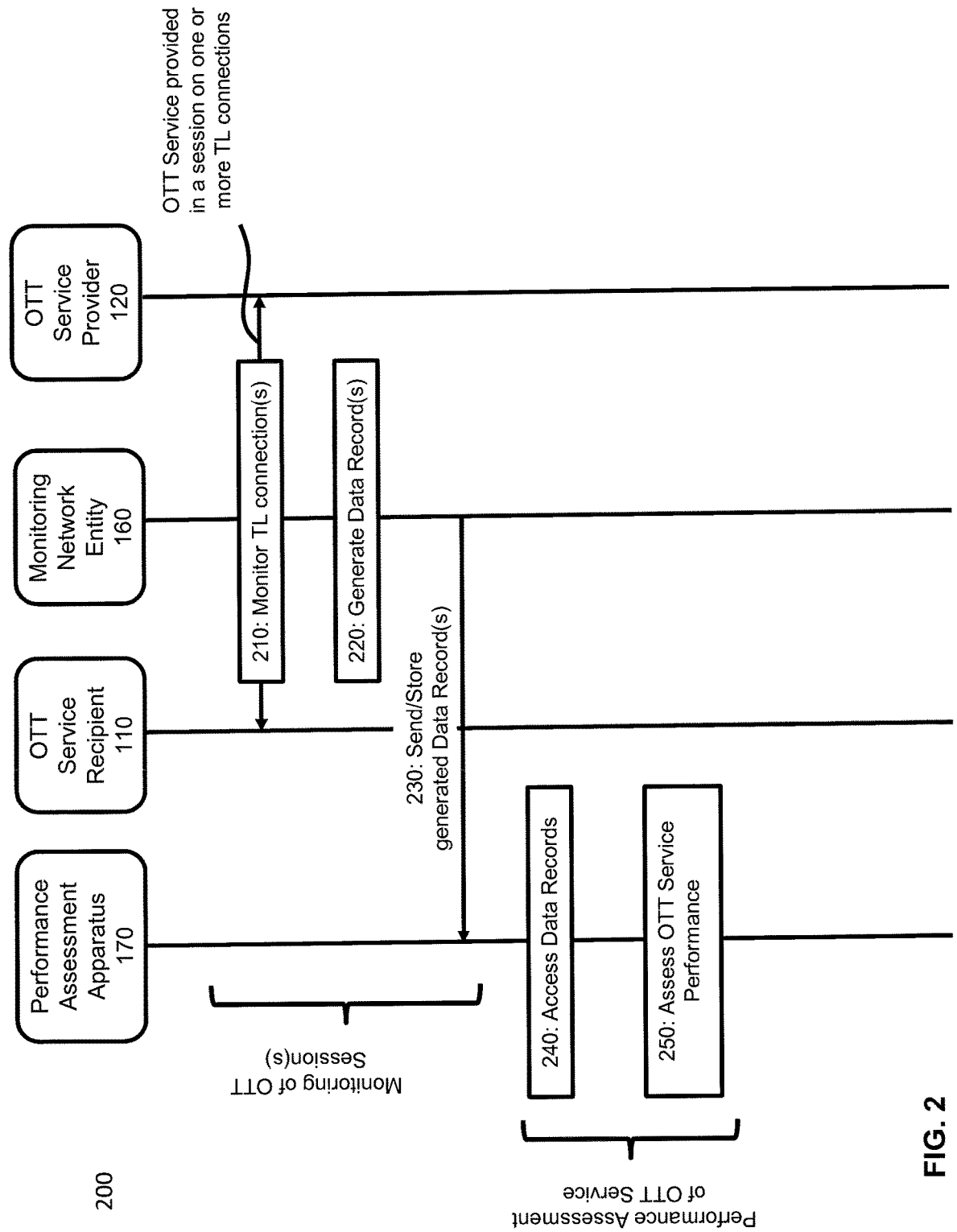
FIG. 2 shows a sequence diagram illustrating method embodiments of monitoring an OTT service and assessing a performance thereof, respectively.

FIG. 2 illustrates in sequence diagram 200 a method embodiment of monitoring the session 130 by the monitoring network entity 160 of FIG. 1 and a method embodiment of assessing performance of an OTT service by the performance assessment apparatus 170 of FIG. 1.

The session 130 comprises one or more TL connections over which data units are exchanged between the session endpoints. Each data unit (e.g., in the form of a data packet) contains network layer and transport layer headers with information that uniquely identifies the associated TL connection. When, for example, the Internet Protocol (IP) is used as the network layer protocol and one of the Transmission Control Protocol (TCP) and the Universal Datagram Protocol (UDP) is used as the transport layer protocol, each TL connection is uniquely identified by 5-tuple information included in the data unit header (IP address of the first endpoint, port of the first endpoint, IP address of the second endpoint, port of the second endpoint, transport type).

In one variant, the endpoint operated by the OTT service provider 120 (e.g., Youtube, Netflix or Spotify) is an Internet server configured to stream media data in accordance with a media streaming protocol such as DASH or HLS to a tablet computer or other user terminal operated by the OTT service recipient 110. The OTT service is provided via the communication network 140 and as a session 130 stretching over one or more TL connections routed through the network site 150 (as shown in FIG. 1).

The monitoring network entity 160 at the network site 150 comprises a network probing function that intercepts the one or more TL connections established for the session 130 between the two session endpoints. In more detail, the monitoring network entity 160 performs SPI to monitor, in step 210 of FIG. 2, the one or more TL connections of the session 130 during successive periods of time. In more detail, SPI parses lower protocol headers up to (and including) the TL for each TL connection. As such, SPI in regard of the TL can be performed even if the data transfer between the endpoint corresponding to the OTT service recipient 110 and the OTT service provider 120 is encrypted in upper protocol layers using, for example, the TL Security (TLS) protocol. Some newer transport protocols (e.g., the Quick UDP Internet Connections, QUIC, protocol) encrypt parts of TL protocol header. SPI is still applicable in these cases, though partial transport layer header encryption may in some variants reduce the number and the accuracy of derived transport layer metrics.

The successive periods of time in which the session 130 is monitored may all have the same duration or may have different durations. Moreover, the successive periods of time may be immediately adjacent to each other or may comprise one or more "temporal gaps". Each period of time typically has a duration between approximately 0.1 sec and approximately 10 sec (e.g., approximately 1 sec).

The monitoring in step 210 includes, for each of the successive periods of time, determining for the at least one TL connection of the session 130 at least one activity metric. The activity metric is indicative of one or more pending TL activities of the session in the respective period of time.

In a further step 220, a data record is generated by the monitoring entity 160 for a period of time with at least one pending TL activity. The data record includes the activity metric associated with that period of time. The monitoring entity 160 may be configured to suppress the generation of a data record in case no pending TL activity has been determined during the period of time associated with the suppressed data record. Absence of a data record with respect to a particular one of the successive periods of time may thus be construed as being indicative of the fact that there has been no pending TL activity in the associated period of time.

A period of time without any pending TL activity corresponds to an idle phase of the session 130. Such an idle phase exists between completion of a pending first TL activity and start of pendency of a second TL activity within a particular period of time associated with a data record generated in step 220. On the other hand, pendency of at least one TL activity marks an activity phase. As will be appreciated, one or more pending TL activities may stretch over a complete one of the successive periods of time. That whole period of time will then be construed as an activity phase. Moreover, one or more activity phases may only consume a fraction of a given period of time (and may thus be indicated, e.g., by a percentage of activeness as activity metric).

Each individual session 130 monitored by the network entity 160 may constantly open new and close existing TL connections. All these TL connections for a given session 130 are jointly monitored by the network entity 160 in regard of pending TL activities. As explained above, the 5-tuple information in the data units intercepted by the monitoring network entity 160 may be analysed by the network entity 160 for grouping two or more TL connections for a particular session 130 and for jointly monitoring the grouped TL connections in regard of pending TL activities. There exist various approaches for determining that a particular TL connection belongs to a particular OTT service and/or a particular OTT service provider. The existing approaches usually combine multiple different classification techniques including regex matches on payload or on different protocol header fields, analysing server names in preceding Domain Name System (DNS) requests, and so on. Each 5-tuple may thus be tagged with or mapped to OTT service and/or OTT service provider information for a proper monitoring per OTT service and/or OTT service provider. Further details in this regard will be explained below with reference to step 620 in FIG. 6.

When the monitoring network entity 160 identifies an ongoing TL messaging procedure between the endpoints corresponding to the OTT service recipient 110 and the OTT service provider 120 (i.e., a TL messaging procedure that has started but is still awaiting completion), it interprets this ongoing TL messaging procedure as a pending TL activity. In other words, a TL activity in the exemplary form of a TL messaging procedure is considered pending as long as one of the two endpoints is presently waiting for at least one TL message from the other endpoint within this TL activity.

As an example, the TL activity may be a TL messaging procedure in the form of a TCP connection setup. The TCP connection setup is a 3-way handshake procedure between the two session endpoints from a first SYN message via an SYN-ACK message to a first ACK message. The corresponding "waiting" period during which this TL activity is pending starts with detecting, by the monitoring network entity 160, the first SYN message and ends with detecting, again by the monitoring network entity 160, the first ACK message.

Another example for a TL activity in the form of a TL messaging procedure is the TCP data transfer mechanism that is governed by an ARQ scheme. Specifically, pendency of a TCP data transfer starts with detecting, by the monitoring network entity 160, transmission of a data unit from one of the two session endpoints to the other endpoint with a sequence number larger than in any of the previously sent and already acknowledge data units. Pendency of this TL activity ends with detecting, by the monitoring network entity 160, transmission of an ACK message from the endpoint indicating having had received all previously sent data units. To this end, the monitoring entity 160 can correlate TCP sequence numbers detected in the transmitted data units with TCP acknowledgment numbers detected in the ACK messages for the same TL connection. As long as the largest detected sequence number is higher than the largest detected acknowledgment number, there are one or more data units for which an acknowledgment is still outstanding (i.e., there is a pending TCP data transfer and thus a pending TL activity).

As a still further example of a TL activity in an exemplary TCP scenario, the TL messaging procedure in connection with setting a TCP window to zero can be mentioned. Pendency of the associated TL activity will start with the monitoring network entity 160 detecting that the endpoint of one of the OTT service recipient 110 and the OTT service provider 120 sets a TCP window size to 0. This means that the corresponding endpoint is busy processing one or more previously received data units. As soon as the monitoring network entity 160 detects that the corresponding endpoint increases the TCP size again (i.e., sends a TCP window update message indicative that data transfer can be resumed again), pendency of the associated TL activity ends.

It will be appreciated that the monitoring operations of the network entity 160 are not limited to TCP. If, for example, the QUIC protocol is used on the TL, acknowledgement numbers are typically encrypted. However, based on suitable heuristics that take into account sequence numbers and packet sizes in the uplink and the downlink directions, pending data transfer periods (i.e., pendency periods associated with outstanding acknowledgment messages for previously transmitted data units) can still be detected with a high reliability.

One exemplary activity metric included in each data record generated in step 220 is indicative of the pendency periods associated with all TL activities that were pending in the period of time associated with that data record. As an example, when the session comprises multiple pending TL activities in the respective period of time, the pendency durations of these TL activities may be aggregated, so that the activity metric is indicative of the total time when at least one TL connection of the session had been in a pending state (due to at least one pending TL activity). Alternatively, or in addition, the data record may be indicative of each individual pendency period of each individual TL activity that was pending during the period of time associated with that data record (such an indication may comprise individual sub-record in the data record per TL activity).

When the session 130 comprises multiple co-existing TL connections in a given period of time, the pending TL activities may also be aggregated across the multiple TL connections. In such a case the activity metric for a given period of time may be indicative of the aggregated pending TL activities detected across the multiple TL connections. For example, the pendency periods of TL activities that have been pending across these multiple TL connections may be aggregated. The aggregated pendency periods may then constitute the activity metric or form a basis for determining the activity metric for the given period of time. When the pending TL activities are distributed over multiple TL connections, their aggregated pendency periods cannot exceed the monitored period of time since pendency durations in regard of different TL connections are not counted twice. Of course, the data record generated in step 220 could alternatively, or in addition, be indicative of each individual pending TL activity (e.g., each individual pendency period thereof) across the multiple TL connections of a session 130.

An individual activity metric may be derived and included in the data record per pending activity type. As explained above, such activity types include a regular data transfer (with outstanding acknowledgment messages) from the endpoint of the OTT service recipient 110 to the endpoint of the OTT service provider 120 (and/or in the opposite direction), a TL connection setup (with an outstanding acknowledgment message) and a paused data transferring (e.g., in connection with setting a TL window size to 0). The data record generated in step 220 may comprise each occurring activity type and the associated activity metric, for example in the form of an Attribute-Value-Pair (AVP).

Moreover, each data record generated in step 220 may additionally be indicative of an activity metric in the form of a maximum acknowledgment delay for a transmitted data unit during the period of time associated with that data record. The maximum acknowledgment delay is defined by the particular data unit message that has been outstanding for the longest time before being acknowledged among all data unit messages that have been outstanding during the period of time associated with a particular data record. Evidently, the maximum acknowledgment delay may exceed the period of time associated with a particular data record.

In a further variant, each data record generated in step 220 is indicative of at least one of the OTT service provider 120 and the OTT service associated with the session 130. To this end, an identifier of the OTT service provider 120 and/or of the OTT service provided by the service provider 120 may be included in the data record.

With continued reference to FIG. 2, the data records generated in step 220 will be sent in step 230 from the monitoring network entity 160 to the performance assessment apparatus 170. Alternatively, the generated data records may be stored in a central network data storage accessible by the performance assessment apparatus 170. In a further variant, the performance assessment apparatus 170 is configured to access the data records in a data storage provided locally at the monitoring network entity 160. In a yet further variant, the generated data records are streamed to the performance assessment apparatus 170.

Step 230 may be performed in regard of each individual data record generated in step 220 (for example immediately after generation of the respective data record). Alternatively, step 230 may be performed for a batch of data records generated in step 220. For example, step 230 may be performed each time a monitored session has ended or timed out. Of course, step 230 could also be performed only once to send (or store) the data records generated for a plurality of sessions. As such, the monitoring network entity 160 and the performance assessment apparatus 170 may operate synchronously or asynchronously.

The performance assessment apparatus 170 accesses in step 240 of FIG. 2 the data records generated for a particular session 130 to assess the performance of the associated OTT service provided via that session 130. Alternatively, the performance assessment apparatus 170 could operate on the data records generated for a plurality of sessions that are associated with the same OTT service or the same OTT service provider for performance assessment.

As explained above, each of the accessed data records includes one or more activity metrics indicative of one or more pending TL activities of a particular session in one of a plurality of successive periods of time. In this regard, the absence of a data record for a particular one of a continuous sequence of successive periods of time may be construed by the performance assessment apparatus 170 to indicate the absence of any pending TL activity in the associated period of time (i.e., as an idle phase).

In a further step 250, the performance assessment apparatus 170 assesses OTT service performance based on the activity metrics included in the accessed data records. In one implementation, the performance assessment apparatus 170 processes the data records to differentiate between idle phases and activity phases of a particular session 130. Idle phases are such phases during the session 130 in which there was no pending TL activity. Activity phases, on the other hand, are such phases during this session 130 in which at least one pending TL activity could be observed. The performance apparatus assessment apparatus 170 then selectively assesses the OTT service performance based on data pertaining to the activity phases.

Assuming that the media streaming protocol defines burst-type data transmissions (such as, e.g., DASH), the performance assessment apparatus 170 processes the information available in the accessed data records for the activity phases to identify data delivery bursts. Data delivery bursts may be identified based on time intervals in which data units were transmitted and based on the associated data volumes.

From the identified data delivery bursts, the performance assessment apparatus 170 estimates a media bitrate as a function of time and assesses the OTT service performance based on the estimated media bitrate. For a reliable media bitrate estimation the performance assessment apparatus 170 classifies the identified data delivery bursts into initial buffering bursts (a burst type that occur prior to media play out at the OTT service recipient 110) and update bursts (a burst type that occur during the media play out). The media bitrate is estimated from the update bursts, disregarding any initial buffering burst. If maximum acknowledgment delay metrics are also included into data records, then this can be used to exclude update bursts with very large delays to further improve the accuracy of bitrate estimates.

Combining the estimated media bitrate and the amount of downloaded media content from the data record(s) accessed in step 240, the buffer state of the endpoint constituted by the OTT service recipient 110 can be estimated as a function of time.

Further KPIs can be derived as the initial buffering time preceding start of media play out and a stall time during which media play out at the OTT service recipient 110 has stalled.

Figure 3:
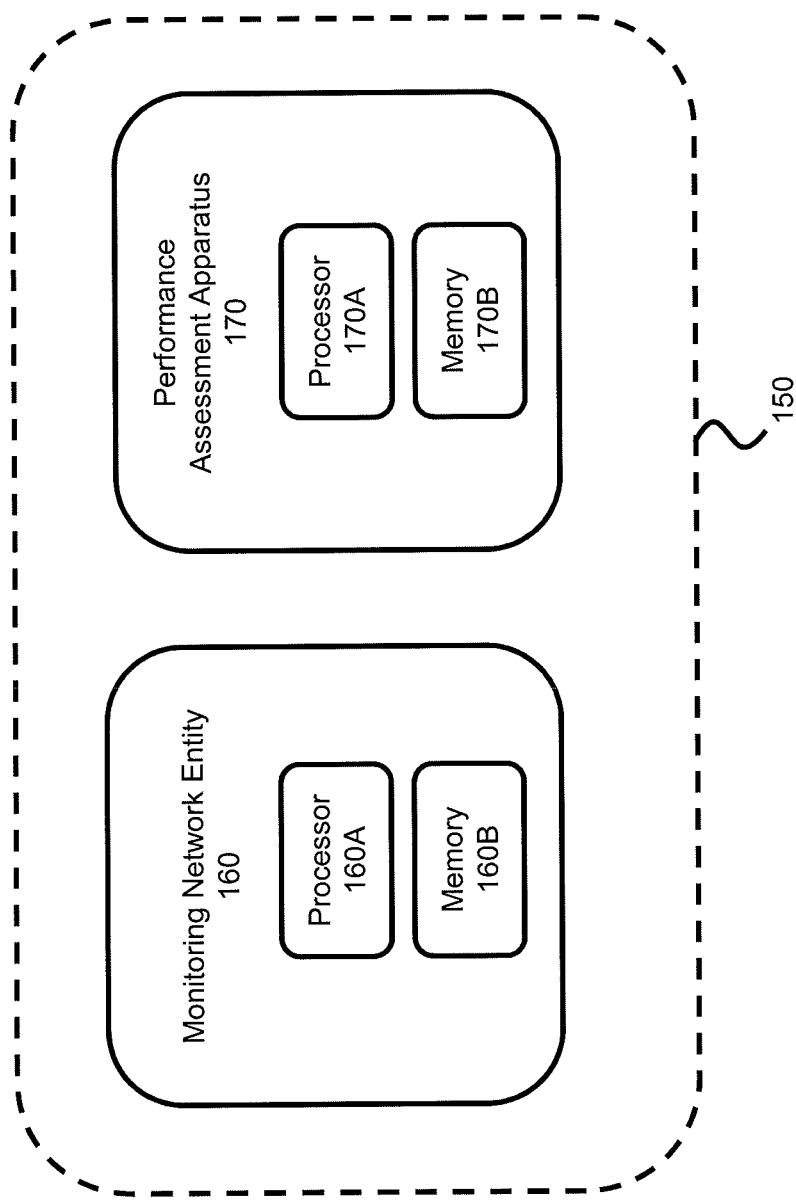
FIG. 3 shows block diagrams schematically illustrating embodiments of a monitoring network entity and a performance assessment apparatus, respectively.

FIG. 3 shows possible realizations of the monitoring network entity 160 and the performance assessment apparatus 170 presented herein. As shown in FIG. 3, the monitoring network entity 160 comprises a processor 160 and a memory 160B coupled to the processor 160A. The memory 160B comprises program code that controls the processor 160A to perform aspects of the techniques presented herein upon executing the program code.

The performance assessment apparatus 170 of FIG. 3 comprises in a similar manner a processor 170A and a memory 170B coupled to the processor 170A. The memory 170B comprises program code that controls the processor 170A to perform aspects of the techniques presented herein upon executing the program code.

Figure 4:
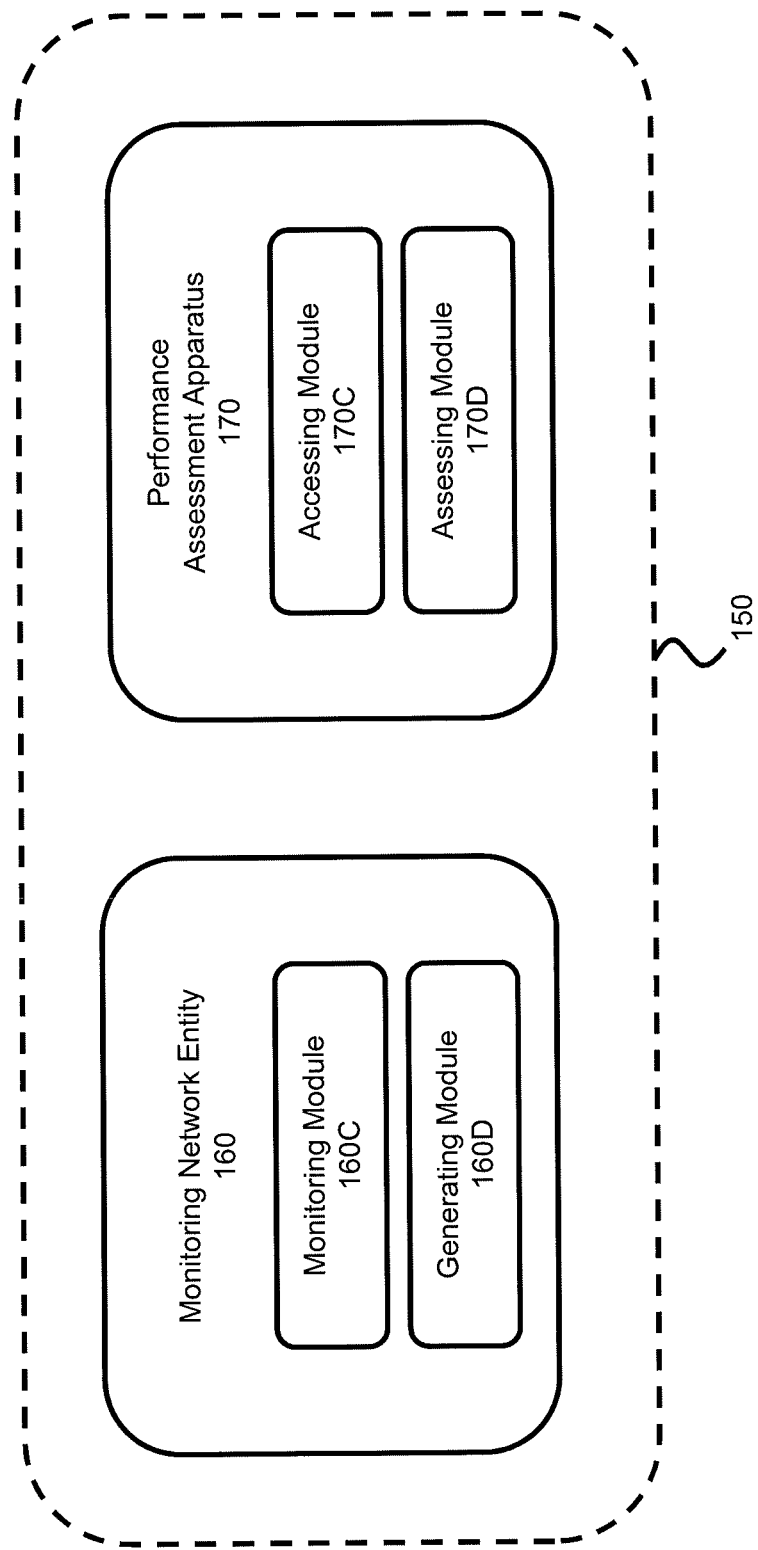
FIG. 4 shows block diagrams schematically illustrating further embodiments of a monitoring network entity and a performance assessment apparatus, respectively.

Further exemplary embodiments of the monitoring network entity 160 and the performance assessment apparatus 170 are illustrated in FIG. 4. As shown therein, the monitoring network entity 160 of FIG. 4 comprises a monitoring module 160 as well as a generating module 160D. These two modules 160C, 160D perform the monitoring and generating processes, respectively, as discussed herein. The modules 160C, 160D may be configured as hardware entities or may be installed as program code in the memory 160B.

The performance assessment apparatus 170 of FIG. 4 comprises in a similar manner an accessing module 170C and an assessing module 170D configured to perform the accessing and assessing operations, respectively, as discussed herein. The modules 170C and 170D may be configured as hardware entities or may be installed as program code in the memory 170B.

Figure 5:
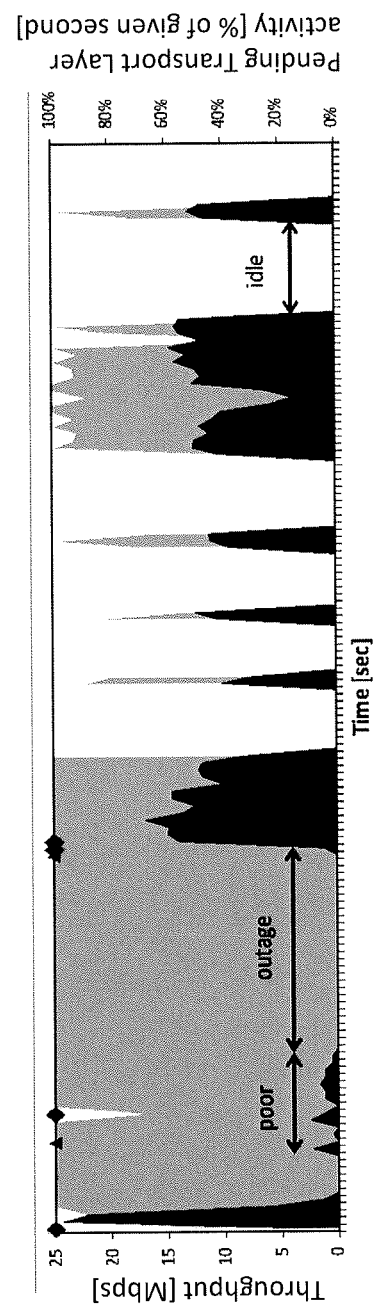
FIG. 5 shows a schematic diagram illustrating a further embodiment of monitoring and assessing an OTT service for a video session example.
Figure 5:
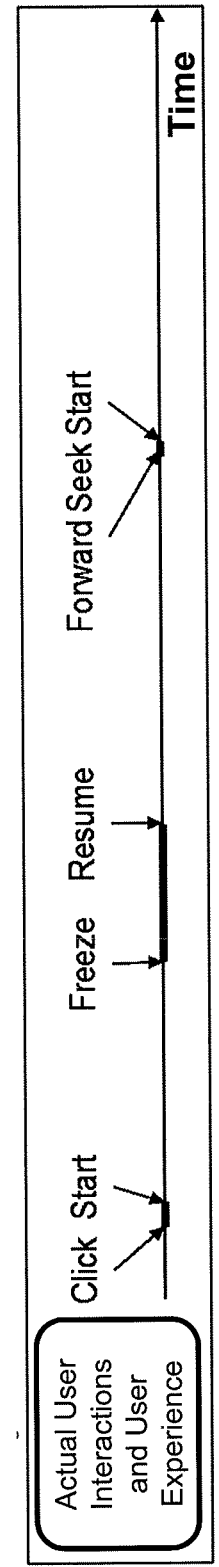

FIG. 5 schematically illustrates a generic TL model and associated KPIs for an individual example session 130 of an OTT service. The TL model has been reconstructed by the performance assessment apparatus 170 based on the data records generated by the monitoring network entity 160 and is indicative of various KPIs for OTT service performance. It is assumed in FIG. 5 that the monitoring is performed during successive periods of time, wherein each period of time has a duration of 1 sec. As such, one data record will be generated per second.

The diagram in the centre of FIG. 5 illustrates the measured data rate (i.e., the measured TL throughput) as a function of time in Mbps in black areas (see axis on the right-hand side). Moreover, the diagram in the centre also illustrates pending TL activities in percent per given second (i.e., per data record/monitoring period) as grey areas. The grey areas thus correspond to activity phases. Idle phases are illustrated in the diagram of FIG. 5 as white areas. The differentiation between activity phases and idle phases as illustrated in FIG. 5 permits a reliable differentiation of periods with 0 TL throughput that are due to, for example, a network outage from periods of time with 0 TL throughput that are due to the fact that there have been no data to transmit (e.g., between two adjacent data delivery bursts).

At the bottom of FIG. 5 actual user interactions and real user experience is shown relative to the TL model in the centre of FIG. 5. A first user interaction is a user click to start media play out during a particular session 130. Media play out starts after an initial buffering time following the click.

At a later point in time media play out freezes due to a network outage (see diagram in the centre of FIG. 5). After the network outage has occurred, media play out will still continue for a few seconds since the media buffer on the side of the OTT service recipient 110 has not been empty. As such, play out will only freeze once the media buffer is actually depleted. When the network outage has ended, the freezed media play out will resume again after a certain stall time. The freezing of the media play out will, of course, result in an unsatisfactory user experience.

At a still later point in time the user seeks forward in the media play out. Due to the seek forward operation, a re-buffering will be required. Media play out will then start again after a further initial buffering time.

Based on the information included in the data records, not only the TL model shown in the centre of FIG. 5 can be generated, but also certain KPIs for the OTT service can be estimated by the performance assessment apparatus 170. As shown in the upper portion of FIG. 5, these KPIs include the initial buffering times associated with the delayed start of media play out after the initial user click and with the later seek forward operation. Another KPI in the form of a play out stall time can be determined for the interval in which play out has freezed due to the network outage. As a still further KPI, the measured data rate in terms of TL throughput can be provided as a function of time (see diagram in the centre of FIG. 5). Thus, intervals with pending TL activities but poor TL throughput can additionally be identified as network bottlenecks that gave rise to a low OTT service performance.

Figure 6:
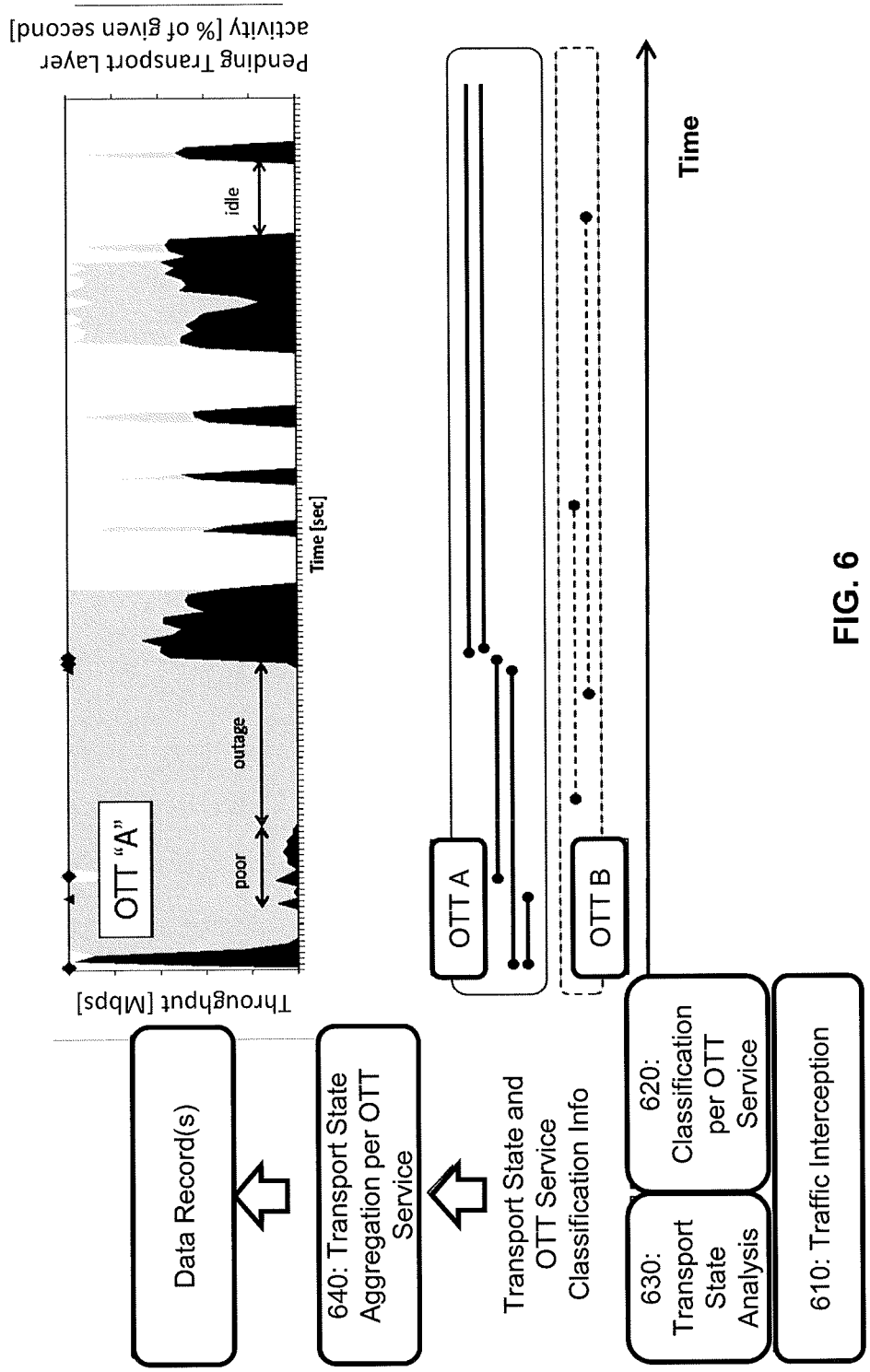
FIG. 6 shows a schematic diagram illustrating a further embodiment of monitoring an OTT service for a video session example.

FIG. 6 schematically illustrates further details of the TL monitoring and data record generation operations by the monitoring network entity 160 relative to a schematic illustration of two parallel sessions for an OTT service A and an OTT service B between the two endpoints corresponding to the OTT service recipient 110 and the OTT service provider 120, respectively (see steps 210 and 220 in FIG. 2) or additional endpoints. FIG. 6 also depicts the TL model discussed above with reference to FIG. 5. It will be assumed that the data records underlying the TL model illustrated in FIG. 5 have been generated for the session associated with OTT service A.

The flow of operations performed by the monitoring network entity 160 is illustrated on the left-hand side of FIG. 6 (from bottom to top), while the right-hand side illustrates temporal details of OTT services A and B in regard of their associated TL connections.

As has been explained above, multiple parallel TL connections can dynamically be established and closed during each ongoing session. This fact is illustrated at the bottom of the right-hand side of FIG. 6 by horizontal lines representative of the durations of individual TL connections (e.g., based on TCP or UDP). The solid lines relate to the session associated with OTT service A, while the dashed lines relate to the session associated to OTT service B.

In the following, the TL monitoring and data record generation operations performed by the monitoring network 160 will exemplarily be described with reference to the session underlying OTT service A. It will be appreciated that similar operations can be carried out in parallel for the session in regard of OTT service B. It will further be appreciated that the sessions associated with OTT service A and OTT service B may be associated with different OTT service recipients 110 as well as different OTT service providers 120. For example, OTT service A may be provided by OTT service provider A to OTT service recipient A, while OTT service B may be provided by OTT service provider B to OTT service recipient B. Also, it is possible to selectively configure which OTT services to monitor. In many cases, performance of background services (e.g., software updates or e-mail deliveries in the background) is typically not of interest.

The network site 150 at which the monitoring network entity 160 is located (see FIG. 1) is selected such that traffic between different OTT service providers 120 and different OTT service recipients 110 can be intercepted for performing SPI as illustrated by step 610 in FIG. 6. In two further steps 620, 630 that may be performed in parallel, the intercepted traffic is classified per OTT service (step 620) and a transport state analysis is performed (step 630).

In step 620, each TL connection is tagged by the OTT service it belongs to. In this manner, a first group of TL connections associated with OTT service A and a second group of TL connections associated with OTT service B are created.

The transport state analysis continuously performed by the monitoring network entity 160 in step 630 detects TL connection lifetime events (such as TL connection establishment or termination, TL connection reset, TL connection timeout, and so on). Additionally, data units are counted and data volumes in both directions (i.e., from the OTT service provider 120 to the OTT service recipient 110 and from the OTT service recipient 110 to the OTT service provider 120) are separately determined. Still further, round-trip times for acknowledgment messages for regular data transfers are measured (e.g., to determine the associated pendency durations, the maximum acknowledgment delay and/or other activity metrics per given period of time as explained above). Therefore, in the transport state analysis step 630 also pending TL activities (e.g., in the form of ongoing TL messaging procedures) are detected. As explained above, for some TL protocols such as TCP, the pending TL activities can further be drilled down in regard of activity types, and so on (see FIG. 5).

The transport state information and OTT service classification information determined in steps 620 and 630 are then processed further in step 640. Specifically, in step 640 the transport state information determined in step 630 is aggregated per OTT service as classified in a step 620. Based on the information resulting from that aggregation in step 640, one or more data records are generated as generally explained above with reference to step 220 in FIG. 2 and as now described in greater detail with reference to FIG. 7.

Figure 7:
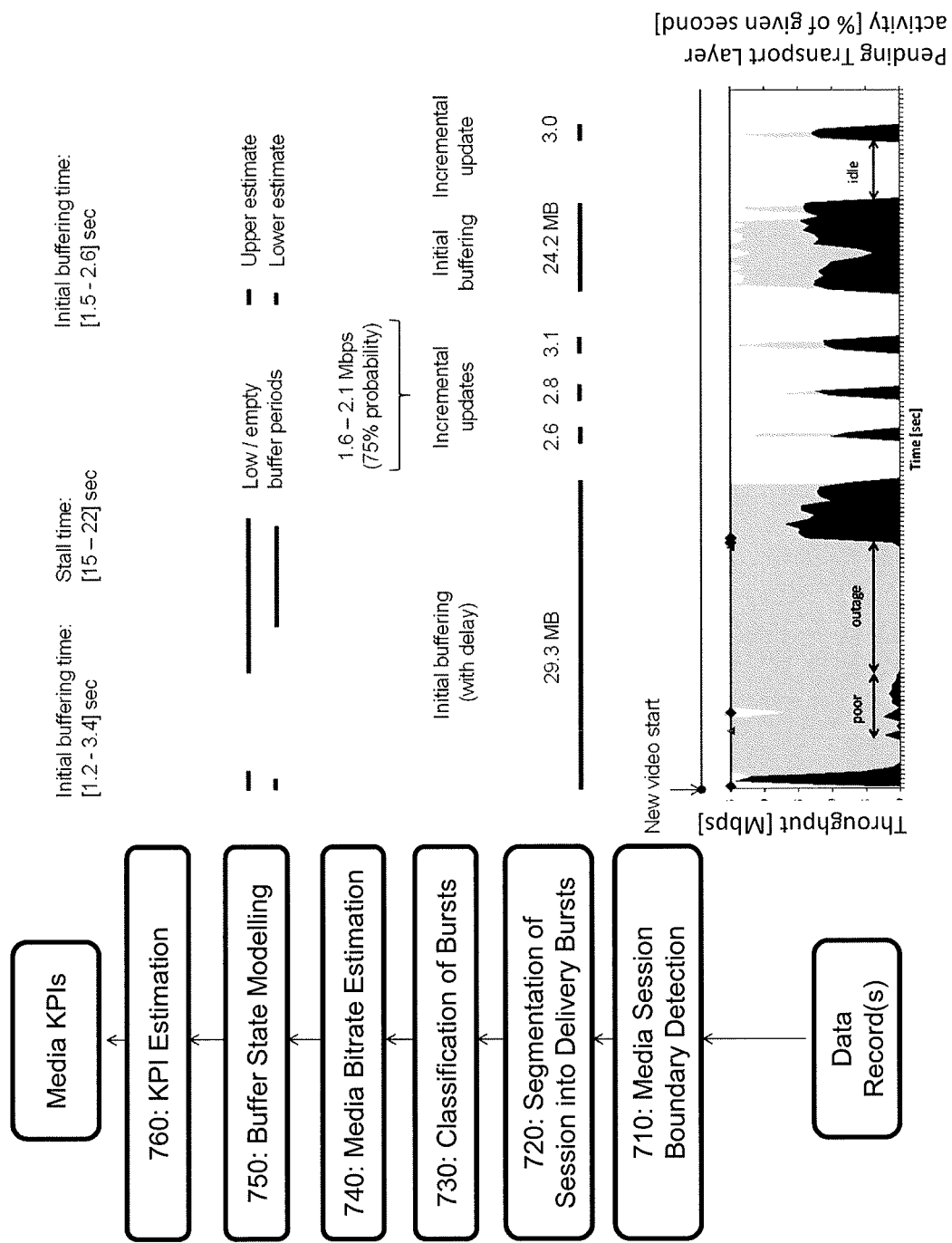
FIG. 7 shows a schematic diagram illustrating a further embodiment of assessing an OTT service for a video session example.

FIG. 7 schematically illustrates the processing operations of the performance assessment apparatus 170 in connection with assessing OTT service performance on the basis of the data records generated by the monitoring network entity 160 (see step 220 in FIG. 2 and see FIG. 6). The corresponding processing flow is illustrated on the left-hand side of FIG. 7 (from bottom to top), while the right-hand side illustrates the associated analysis process with reference to the TL model discussed above with reference to FIG. 5.

Based on the data records accessed by the performance assessment apparatus 170 (see step 240 in FIG. 2), the OTT service performance assessment (see step 250 in FIG. 2) starts in step 710 with the detection of media session boundaries per media session associated with a particular OTT service (such as the OTT service A in FIG. 6). The media session boundaries will be identified from TL patterns in the data records. In an exemplary YouTube scenario, different videos are usually served from different video servers. As a result, a new TL connection to a new video server indicates start of a new video session. Step 710 is optional and will be performed dependent on the particular OTT service for which the data records have been generated.

In step 720, the data records are segmented into individual media delivery bursts as generally illustrated on the right-hand side of FIG. 7 above the diagram from FIG. 5.

Then, in step 730, the individual media delivery bursts are classified into initial buffering bursts on the one hand and update bursts (e.g., incremental update bursts) on the other. Initial buffering bursts are generated when a new media session is opened or when a seek-forward operation is performed. Update bursts, on the other hand, are typically sent periodically after an initial buffering burst. Each of these two burst types can further be classified as either normal or delayed depending on delay information in a respective data record. Typical burst sizes and bursts timings are dependent on the type of the analysed OTT service and also on the type of the endpoint operated by the OTT service recipient 110. Therefore, the operations underlying steps 720 and 730 can individually be parameterized for each combination of OTT service type and endpoint type.

In step 740, the media bitrate (i.e., the media encoding rate) is estimated. This estimation can be performed based solely on the update bursts with regular data transmission behaviour (e.g., no significant delays as indicated, for example, by the maximum acknowledgment delay in a particular data record). The output of step 740 is typically a probabilistic metric (i.e., an estimated bitrate range with an associated probability, see FIG. 7). As will be appreciated, not all media sessions will have a series of incremental update bursts (e.g., in case of video content that has only a small data volume or under continuously bad network conditions, no such incremental update burst will be used). In such scenarios the overall media bitrate distribution for a given combination of OTT service type and endpoint type can be used instead of an actual estimation. It is, for example, known that 90% of YouTube videos today have a media bitrate distribution between 400 kbps-2.5 Mbps. For Netflix, this distribution ranges between 700 kbps-2 Mbps. While such distributions are very rough, they still provide meaningful information.

In step 750, a media buffer state of the endpoint associated with the OTT service recipient 110 is estimated based on the information derived in the previous steps. Additionally, in step 760, KPIs for the individual OTT services are estimated from the buffer estimation in step 750.

For the buffer state estimation in step 750 it will be assumed that the beginning of each initial buffering burst clears the buffer content. From this point in time, all downloaded data units increase the amount of buffered media content. It will further be assumed that media play out starts when the buffer reaches a predefined minimum fill level, which typically is dependent on the associated OTT service and can also be dependent on the type of the endpoint operated by the OTT service recipient 110. After this point in time it is assumed that the buffer size will decrease linearly with the elapsed time and proportional to a media encoding bitrate. It will further be assumed that when the buffer becomes depleted, media play out will stall.

Since most parameters impacting the buffer state (such as media bit rate, minimum buffer fill level and so on) are probabilistic, buffer state estimation is performed several times with different values of these parameters to determine, for example, a best case, a medium case and a worst case or a case corresponding to a randomly selected parameter set (e.g., according to the distributions of these parameters). The resulting plurality of buffer state estimations are providing probabilistic KPI distributions as illustrated at the top of the right-hand side of FIG. 7.

Figure 8:
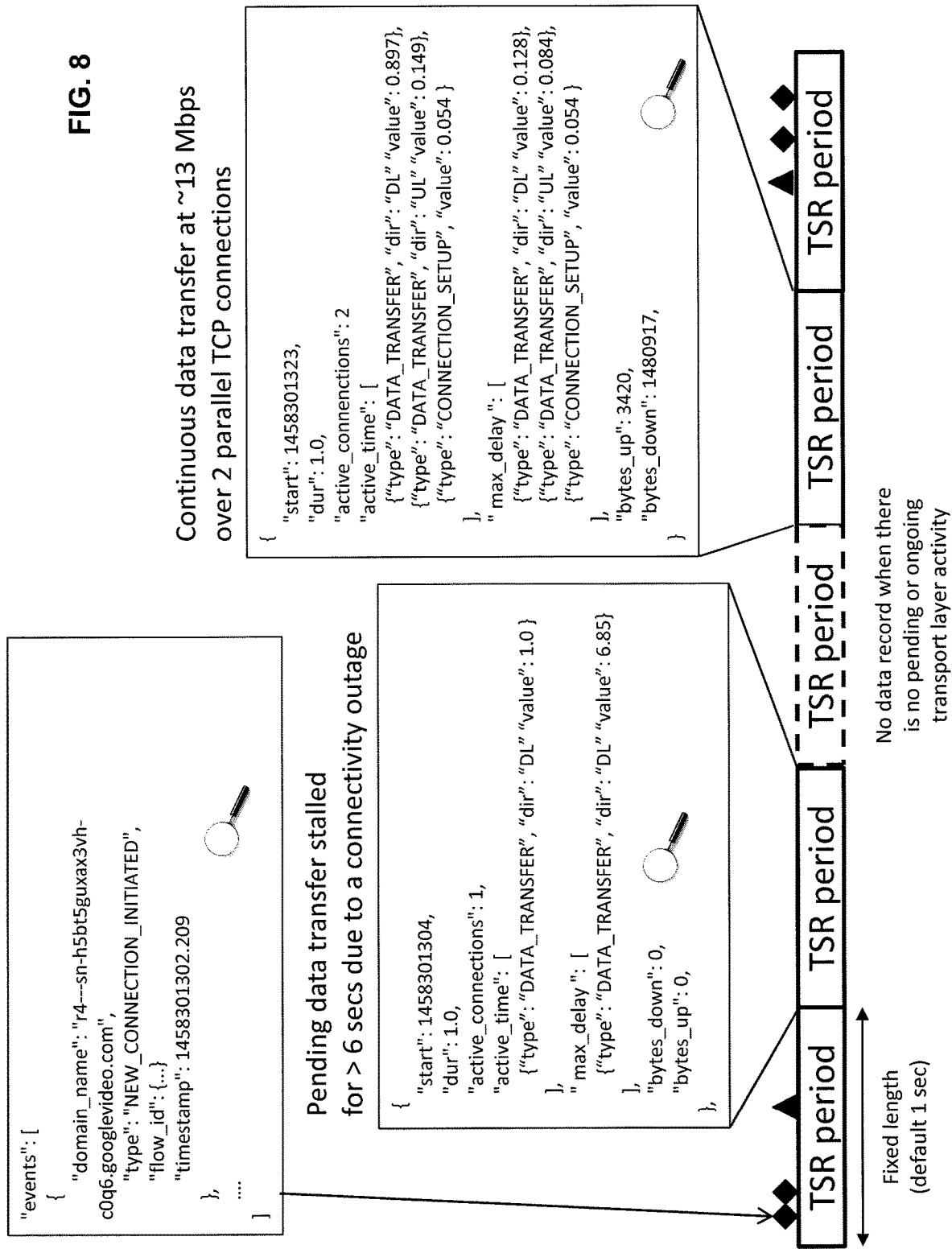
FIG. 8 shows a schematic diagram of exemplary data records generated and assessed in accordance with the embodiments of FIGS. 1 to 7.

With reference to FIG. 8, possible implementations of data records are illustrated for consecutive periods of time (called TL Session Records, or TSRs in FIG. 8). Each data record comprises a header with information such as an endpoint identifier for one or both of the endpoint associated with the OTT service recipient 110 and the endpoint associated with the OTT service provider 120. Additionally, the header may comprise an identifier of the OTT service recipient 110 (e.g., a user ID). As has been explained above, each monitored session is fragmented into successive periods of time (having a fixed duration of, for example, or 1 sec) and one data record is generated for each period of time with a pending TL activity. As illustrated in FIG. 8, generation of a data record may be omitted for a period of time in which there is no pending TL activity.

The data record generated for a particular period of time contains activity metrics about pending TL activities that have occurred in this period of time. The activity metrics have been aggregated for all TL connections belonging to one session 130 (see also FIG. 6).

The activity metrics in each data record generally include the data volumes sent in upstream and downstream directions (i.e., from the endpoint of the OTT service recipient 110 to the endpoint of the OTT service provider 120 and vice versa), the aggregated pendency durations (i.e., the aggregated durations of all activity phases during the period of time associated with a particular data record), information (e.g., durations) of idle phases, the number of active TL connections, and so on. Also the maximum acknowledgment delay is indicated as a further activity metric in each data record.

In the specific scenario illustrated in FIG. 8, the corresponding activity metrics are indicated as AVPs and include the aggregated pendency duration (denoted as "active_time") for each of the following activity types: downlink data transmission, uplink data transmission, and connection setup. The activity metrics further include the maximum acknowledgement delay for each of these activity types. Also the data volumes in the upstream and downstream directions are indicated.

In the Appendix at the end of this description, an annotated format definition example for data records generated by the monitoring network entity 160 is presented using Google Protocol Buffers schema definition language. This format definition forms the basis of the exemplary data records illustrated in FIG. 8. The format definition can be revised (e.g., extended or reduced) depending on the KPIs of interest.

In addition to the activity metrics, each data record may be enriched with information about different kinds of TL events that have occurred during the associated period of time. Such events comprise TL connection lifetime events (TL connection establishment, regular TL connection termination, TL connection reset, TL connection time out and so on). As has been explained above, information about such events can be useful to identify session boundaries and other session parameters. Also failure events generated by network nodes in the communication network 140 (e.g., a radio access network node or a core network node), cell location and similar information can be included as events into the data records to extend OTT service performance estimation with root cause analysis and/or trouble shooting functionality.

In the specific scenario illustrated in FIG. 8, the corresponding event information includes an event type (e.g., initiation of a new TL connection) with an associated time stamp. Also a domain name and a flow identifier associated with the event can be indicated. This information can be used, for example, in step 710 of FIG. 7 to identify media session boundaries (e.g., several OTT service providers open one or more new TL connections when a client application on the side of the OTT service recipient 110 is starting a new media session, e.g., clicking on a new YouTube video).

As has become apparent from the above description of exemplary embodiments, the present disclosure provides efficient techniques for TL monitoring and for an associated performance assessment of OTT services. The monitoring may be performed based on SPI, which has a smaller hardware footprint than DPI and which can also be performed in regard of TL encrypted data traffic (e.g., in connection with QUIC). The overall maintenance efforts are low since a generic and OTT-independent TL modelling can be applied. The modelling parameters have to be defined only once for a few major TL protocols (such as TCP, UDP or QUIC) and need only rarely be updated. Many of the individual performance assessment operations are very generic since many OTT service providers use very similar TL media delivery patterns. Only a few associated parameters are actually OTT service provider-specific, such as a periodicity of media delivery bursts. All such parameters can easily be derived via machine learning.

It will be appreciated that the above embodiments are only of an exemplary nature and do not restrict the scope of the claims appended hereto.

APPENDIX

```
syntax = "proto2";
option cc_enable_arenas = true;
package captool.report;
import "id.proto";
message transport_session {
    required id_t id = 1;
    enum transport_t {
        TCP = 0;
        QUIC = 1;
    }
    required transport_t transport = 2;
    required string ott = 3;                    // Name of the OTT service
    repeated traffic_t dominant_tags = 4;       // Dominant traffic classification tags (in terms of
                                                bytes)
    repeated period_t periods = 5;              // Transport layer period descriptors
}
```

APPENDIX-continued

```
                                        // All time metrics measured in us
message period_t {
    required uint64 start = 1;
    required uint32 dur = 2;
    required uint32 active_connections = 3;    // Total number of active connections in this period
                                                  (ongoing connection setup, data transfer, zero
                                                  window waiting or connection end event)
    optional uint32 bytes_up = 4;              // ACKed bytes in uplink direction for TCP, estimated
                                                  ACKed bytes for QUIC
    optional uint32 bytes_down = 5;            // ACKed bytes in downlink direction for TCP,
                                                  estimated ACKed bytes for QUIC
    optional outage_t outage = 6;              // Hints for eventual connectivity outages preceeding
                                                  this period
    repeated transport_metric_t active_time = 7;   // Various kinds of active time statistics for this
                                                      period
    repeated transport_metric_t max_delay = 8;     // Various kinds of max delay statistics for this
                                                      period
    repeated transport_event_t events = 9;     // Network and transport layer events
}
message transport_metric_t {
    required uint32 value = 1;
    enum type_t {
        CONNECTION_SETUP = 0;
        DATA_TRANSFER = 1;
        ZERO_WINDOW_WAIT = 2;
    }
    required type_t type = 2;
    enum direction_t {
        UP = 0;
        DOWN = 1;
    }
    optional direction_t direction = 3;
}
message outage_t {
    required uint32 connections = 1;           // total number of transport connections where
                                                  outage hints had been detected
    required uint32 max_retransmissions = 2;   // max number of retransmissions for a given
                                                  transport connection
}
message transport_event_t {
    required uint64 timestamp = 1;
    enum type_t {
        NEW_CONNECTION_INITIATED = 0;
        NEW_CONNECTION_ESTABLISHED = 1;
        CONNECTION_TIMEOUT = 2;
        CONNECTION_END = 3;
        CONNECTION_RESET = 4;
        NEW_PDN_SESSION = 5;
    }
    required type_t type = 2;
    optional flow_id_t flow_id = 3;
    optional string domain_name = 4;
}
```

The invention claimed is:

1. A network entity for monitoring Over The Top (OTT) performance, the network entity comprising:

processing circuitry;

memory containing instructions executable by the processing circuitry whereby the network entity is operative to:

monitor, at a network site between the two endpoints and during successive periods of time, at least one Transport Layer (TL) connection of the session, wherein the monitoring includes, for each period of time, determining for the at least one TL connection of the session at least one activity metric indicative of at least one pending TL activity of the session in the respective period of time;

wherein the at least one pending TL activity is a TL messaging procedure in which one endpoint is presently waiting for at least one TL message from the other endpoint;

wherein the at least one activity metric is indicative of at least one pendency period associated with the at least one pending TL activity of the session; and generate, for a period of time with at least one pending TL activity, a data record that includes the activity metric associated with that period of time.

2. The network entity of claim 1, wherein the at least one TL message includes:

an acknowledgement message from a receiving endpoint for a previously transmitted data unit;

an acknowledgement message in a TL connection setup procedure; and/or a resumption message from a receiving endpoint having paused a data transfer for being busy processing one or more previously received data units.

3. The network entity of claim 1:

wherein the session comprises multiple pending TL activities in the respective period of time; and wherein the activity metric is indicative of the aggregated pendency periods of the multiple pending TL activities.

4. The network entity of claim 1:
wherein the session comprises multiple co-existing TL connections in a given period of time;
wherein the instructions are such that the network entity is operative to aggregate pending TL activities in the given period of time across the multiple TL connections; and
wherein the activity metric for the given period of time is indicative of the aggregated pending TL activities.

5. The network entity of claim 1, wherein the data record is indicative of one or more activity metrics, wherein each activity metric is associated with a dedicated activity type.

6. The network entity of claim 5, wherein the activity types include:
a data transfer from the service provider endpoint to the service recipient endpoint;
a data transfer from the service recipient endpoint to the service provider endpoint;
a TL connection setup;
a data transfer being paused by the service recipient endpoint for being busy processing one or more previously received data units; and/or
a data transfer being paused by the service provider endpoint for being busy processing one or more previously received data units.

7. The network entity of claim 1, wherein the activity metric included in the data record is indicative of a maximum acknowledgement delay for a transmitted data unit occurring during the period of time associated with that data record.

8. The network entity of claim 1, wherein the data record includes a separate sub-record for:
each individual pending TL activity occurring during the period of time associated with that data record; and
if pending TL activities are grouped into activity types, each individual activity type occurring during the period of time associated with that data record.

9. The network entity of claim 1, wherein the data record is indicative of a data volume transmitted during the period of time associated with that data record.

10. The network entity of claim 9, wherein the data record differentiates between a first data volume transmitted from the service provider endpoint to the service recipient endpoint and a second data volume transmitted from the service recipient endpoint to the service provider endpoint.

11. The network entity of claim 1:
wherein the data transfer between the service provider endpoint and the service recipient endpoint is encrypted; and
wherein the instructions are such that the network entity is operative to determine the activity metric without decrypting the data transfer.

12. An apparatus for assessing service performance from a session between an Over The Top (OTT) service provider endpoint and an OTT service recipient endpoint in regard of an OTT service, the apparatus comprising:
processing circuitry;
memory containing instructions executable by the processing circuitry whereby the apparatus is operative to:
access data records generated for successive periods of time for the session,
wherein each data record includes at least one activity metric indicative of at least one pending Transport Layer (TL) activity of the session in the period of time associated with that data record;
wherein the at least one pending TL activity is a TL messaging procedure in which one endpoint is presently waiting for at least one TL message from the other endpoint;
wherein the at least one activity metric is indicative of at least one pendency period associated with the at least one pending TL activity of the session; and
assess performance of the OTT service based on the at least one activity metric.

13. The apparatus of claim 12, wherein the instructions are such that the apparatus is operative to assess the OTT service performance by:
processing the data records to differentiate between idle phases and activity phases during the session; and
assess the OTT service performance based on the activity phases and not based on the idle phases.

14. The apparatus of claim 12, wherein the instructions are such that the apparatus is operative to assess the OTT service performance by:
identifying one or more data delivery bursts from the data records;
estimating a media bitrate from the identified one or more data delivery bursts; and
assessing the OTT service performance based on the estimated data rate.

15. The apparatus of claim 14, wherein the instructions are such that the apparatus is operative to:
classify the identified one or more data delivery bursts at least into an initial buffering burst type and an update burst type; and
estimate the media bitrate from one or more update bursts and not from any initial buffering burst.

16. The apparatus of claim 12, wherein the instructions are such that the apparatus is operative to assess the OTT service performance by:
estimating, from the received data records, a buffer state of the service recipient as a function of time; and
assessing the OTT service performance based on a temporal variation of the buffer state.

17. A method of generating a data record indicative of pending Transport Layer (TL) activities of a session between an Over The Top (OTT) service provider endpoint and an OTT service recipient endpoint, the method comprising:
monitoring, at a network site between the two endpoints and during successive periods of time, at least one TL connection of the session, wherein the monitoring includes, for each period of time, determining for the at least one TL connection of the session at least one activity metric indicative of at least one pending TL activity of the session in the respective period of time;
wherein the at least one pending TL activity is a TL messaging procedure in which one endpoint is presently waiting for at least one TL message from the other endpoint;
wherein the at least one activity metric is indicative of at least one pendency period associated with the at least one pending TL activity of the session; and
generating, for a period of time with at least one pending TL activity, a data record that includes the activity metric associated with that period of time.

18. A method of assessing service performance from a session between an Over The Top (OTT) service provider endpoint and an OTT service recipient endpoint in regard of an OTT service, the method comprising:
accessing data records generated for successive periods of time for the session, wherein each data record includes at least one activity metric indicative of at least one pending Transport Layer (TL) activity of the session in the period of time associated with that data record;

wherein the at least one pending TL activity is a TL messaging procedure in which one endpoint is presently waiting for at least one TL message from the other endpoint;

wherein the at least one activity metric is indicative of at least one pendency period associated with the at least one pending TL activity of the session; and assessing performance of the OTT service based on the at least one activity metric.

\* \* \* \* \*